United States Patent
Hung et al.

(10) Patent No.: US 7,538,530 B2
(45) Date of Patent: May 26, 2009

(54) BUCK CONVERTER

(75) Inventors: Hsiang-Jui Hung, Taipei (TW); Han-Hsun Chen, Taipei (TW); Chun-San Lin, Taipei (TW); Sun-Chen Yang, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 282 days.

(21) Appl. No.: 11/528,337

(22) Filed: Sep. 28, 2006

(65) Prior Publication Data

US 2007/0262755 A1 Nov. 15, 2007

(30) Foreign Application Priority Data

Jan. 2, 2006 (TW) .............................. 95100062 A (51) Int. Cl.
*G05F 1/40* (2006.01)

(52) U.S. Cl. ........................................ 323/282; 307/66

(58) Field of Classification Search ......... 323/282–290, 323/222; 363/16–20; 307/44, 66, 87
See application file for complete search history.

(56) References Cited

U.S. PATENT DOCUMENTS

| | | | |
|---|---|---|---|
| 4,727,308 A * | 2/1988 | Huljak et al. ............... | 323/222 |
| 5,144,222 A | 9/1992 | Herbert | |
| 5,278,453 A | 1/1994 | Pollmeier | |
| 5,552,643 A * | 9/1996 | Morgan et al. ............. | 307/81 |
| 2007/0241732 A1* | 10/2007 | Luo et al. .................. | 323/281 |

FOREIGN PATENT DOCUMENTS

| CN | 1049537 | 2/2000 |
|---|---|---|
| CN | 1383703 | 12/2002 |

* cited by examiner

*Primary Examiner*—Rajnikant B Patel
(74) *Attorney, Agent, or Firm*—Winston Hsu (57) ABSTRACT

The invention relates to a buck converter including a first high-side switch circuit having an input terminal electrically connected to a first power input terminal, a control terminal electrically connected to a first control signal source, and an output terminal; a second high-side switch circuit having an input terminal electrically connected to a second power input terminal, a control terminal electrically connected to a second control signal source, and an output terminal electrically connected to the output terminal of the first high-side switch; a lower-side switch circuit having a first terminal electrically connected to the output terminal of the first high-side switch and a second terminal electrically connected to a reference power terminal; and a filter electrically connected to the output terminal of the first high-side switch and a power output terminal, wherein the first and second high-side switch circuits will not turn on at the same time.

18 Claims, 7 Drawing Sheets

BUCK CONVERTER

BACKGROUND OF THE INVENTION

1. Field of the Invention

The present invention relates to a voltage converter, and more specifically, to a buck converter.

2. Description of the Prior Art

Normally, there are only a few main power supplies for electronic devices. These include, for example, 12V and 9V; however, various integrated circuits providing a variety of different functions are implemented in systems of electronic devices that do not utilize said power supplies but rather different power sources, such as 5V and 3V. Therefore, a set of buck converters is needed to convert the main power supply into a variety of other required voltages.

Figure 1:
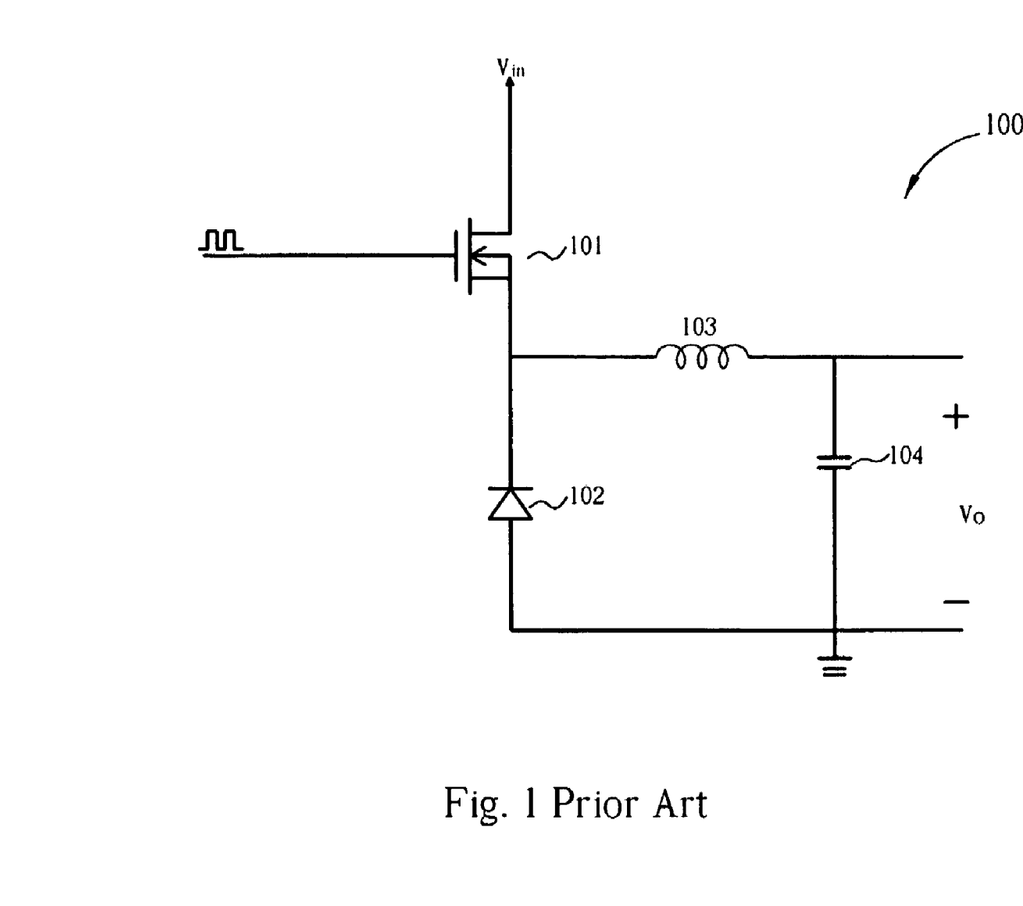
FIG. 1 illustrates a circuit diagram of a prior art buck converter.
Figure 2:
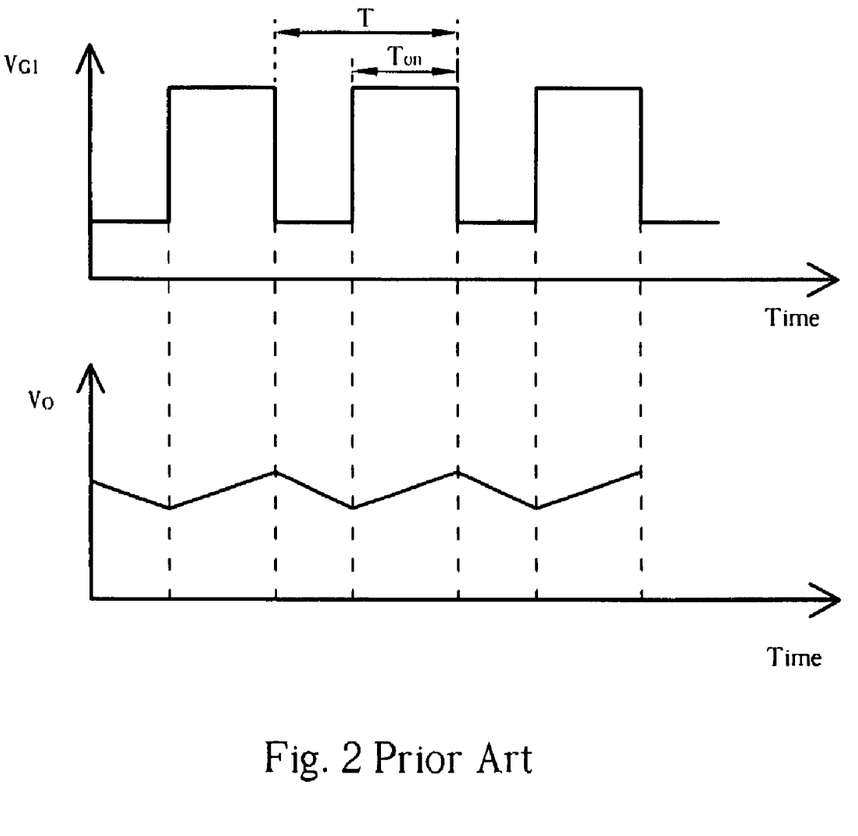
FIG. 2 illustrates a timing diagram of a prior art control signal received from the control terminal of transistor and an output voltage at the power output terminal.

Referring to FIG. 1, FIG. 1 illustrates a circuit diagram of a prior art buck converter 100. A power source $V_{in}$ is provided to an input terminal of a transistor 101. Transistor 101 includes a control terminal and an output terminal, wherein the output terminal is electrically connected to a first terminal of diode 102; and a second terminal of diode 102 is connected to ground. A first terminal of an inductor 103 is electrically connected to the output terminal of transistor 101 while the second terminal and a power output terminal are electrically connected to the first terminal of capacitor 104. In addition, the second terminal of capacitor 104 is electrically connected to ground. Referring to FIG. 2, FIG. 2 illustrates a timing diagram of a control signal $V_{G1}$ received from the control terminal of transistor 101 and an output voltage $V_o$ at the power output terminal. As shown in FIG. 2, when control signal $V_{G1}$ corresponds to a high voltage level, output voltage $V_o$ increases gradually; when control signal $V_{G1}$ corresponds to a low voltage level, output voltage Vo decreases gradually. In the prior art, the relationship between the average output voltage $V_o$ and power source $V_{in}$ is shown as below:

$$V_o/V_{in}=D \quad \text{Equation (1)}$$

In Equation (1), D is equal to $T_{on}/T$, which is the duty cycle of the control signal $V_{G1}$. Therefore, a circuit designer is capable of adjusting the duty cycle of the control signal $V_{G1}$ to obtain the required output voltage $V_o$.

It should be noted that output voltage $V_o$ includes ripples, and the magnitude of the ripples will degrade the output power quality of the buck converter. In order to decrease the magnitude of the ripples, the prior art increases the frequency of the control signal $V_{G1}$. Although this does decrease the ripples, a consequence is that a higher frequency will increase the on/off switching frequency of transistor 101. As a result, the switching loss increases. Furthermore, unwanted heat is generated due to the high on/off switching frequency. This unwanted heat will decrease the life of the transistor 101.

Figure 3:
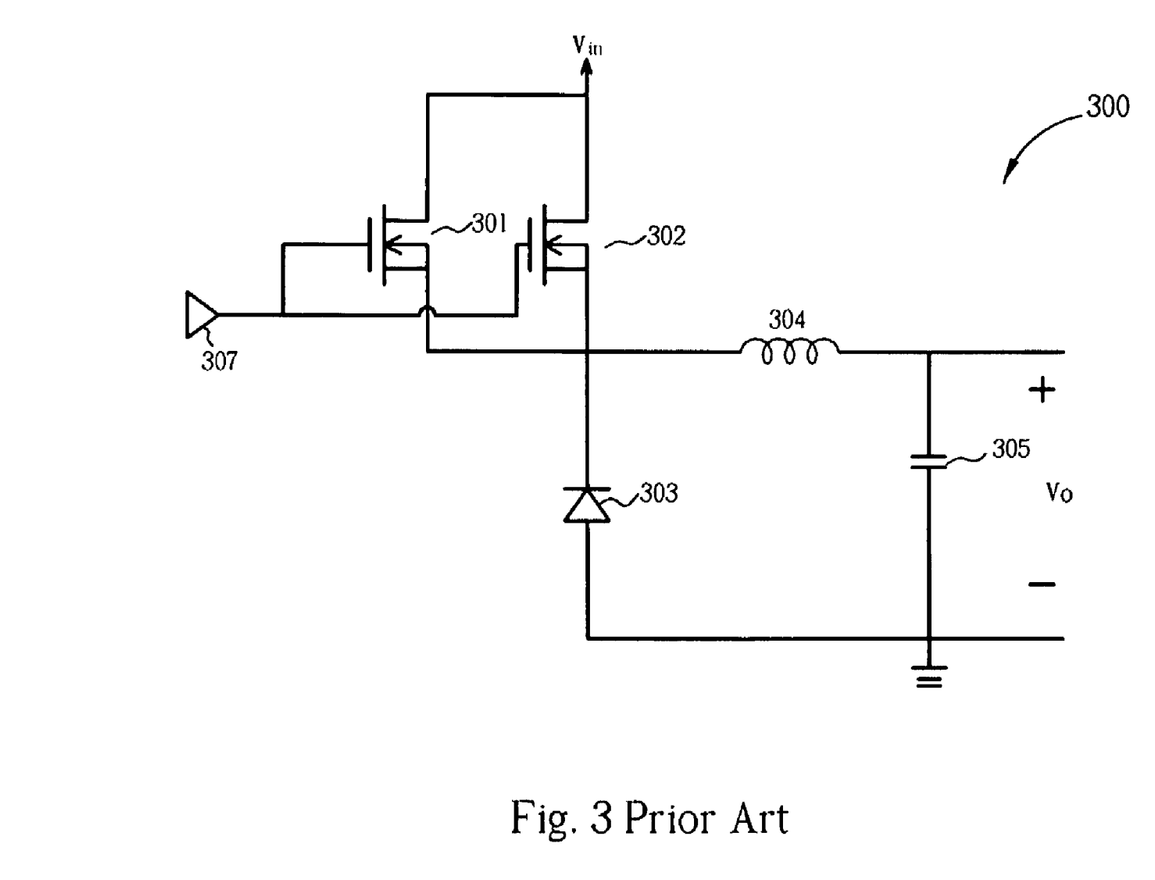
FIG. 3 illustrates a circuit diagram of another prior art buck converter.

Referring to FIG. 3. FIG. 3 illustrates a circuit diagram of another prior art buck converter 300. Prior art buck converter 100 differs from prior art buck converter 300 in that the transistor 301 and the transistor 302 are jointly connected to a control signal source 307, and control signal source 307 generates a control signal to turn on or turn off both transistor 301 and transistor 302 simultaneously. Accordingly, the power stress imposed on transistor 301 and transistor 302 will decrease. However, the switching loss caused by the high on/off frequency of transistor 301 and transistor 302 still exists.

SUMMARY OF THE INVENTION

Therefore, one of the objectives of the present invention is to provide a buck converter capable of reducing the operating frequency of a single high-side switch circuit.

Another objective of the present invention is to provide a buck converter capable of reducing switching loss of the high-side switch circuit.

Another objective of the present invention is to provide a buck converter capable of prolonging the life of the high-side switch circuit.

Another objective of the present invention is to provide a buck converter capable of reducing the area of the entire system.

Another objective of the present invention is to provide a buck converter capable of reducing the output of ripples.

According to the purposes of the present invention, the present invention discloses a buck converter and comprises a first high-side switch circuit, having a first high-side switch input terminal electrically connected to a first power input terminal, a first high-side switch control terminal electrically connected to a first control signal source and a first high-side switch output terminal; a second high-side switch circuit, having a second high-side switch input terminal electrically connected to a second power input terminal, a second high-side switch control terminal electrically connected to a second control signal source and the second high-side switch output terminal, and a second high-side switch output terminal being electrically connected to the first high-side switch output terminal; a lower-side switch circuit, having a first lower-side switch terminal electrically connected to the first high-side switch output terminal and a second lower-side switch terminal electrically connected to a reference power terminal; and a filter circuit, having a filter input terminal electrically connected to the first high-side switch output terminal and a filter output terminal electrically connected to a power output terminal; wherein the first control signal source and second control signal source make the first high-side switch circuit and the second high-side switch circuit not turn on at the same time.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
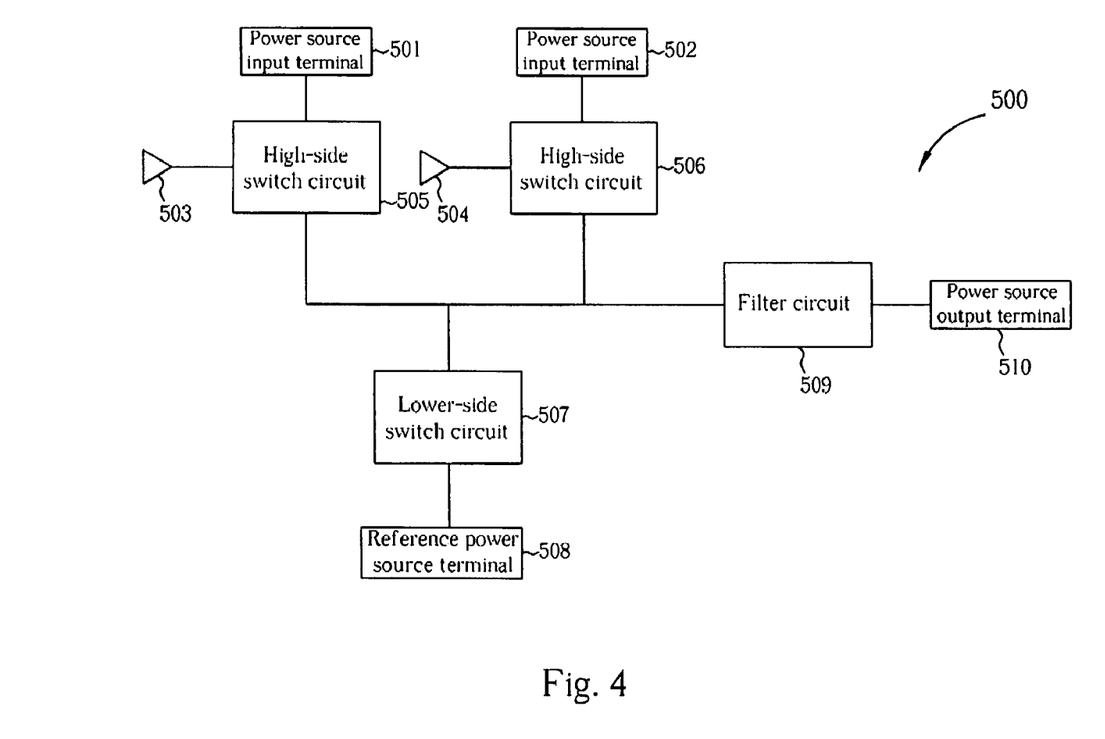
FIG. 4 illustrates a system block diagram of a buck converter according to the present invention.

Referring to FIG. 4, FIG. 4 illustrates a system block diagram of a buck converter 500 according to the present invention. The buck converter 500 comprises power source input terminals 501, 502, which are referred to as the first power source input terminal and the second power source input terminal, respectively, to provide an input voltage, such as 12V or 5V. However, power source input terminals 501, 502 of buck converter 500 according to the present invention are not restricted to this application, for example, they can be applied to other voltage converting systems, such as a 9V-to-5V converter or a 3V-to-1.8V converter, etc. Control signal sources 503, 504 can be referred to as the first control signal source and the second control signal source, respectively, to provide control signals and control high-side switch circuits 505, 506 according to duty cycle D of the control signals. The first high-side switch output terminal and the second high-side switch input terminal of high-side switch circuits 505, 506 are electrically connected to power source input terminals 501, 502, respectively. The high-side switch circuits 505, 506 utilize control signal sources 503, 504 to perform fundamental DC-DC chopping for power source input terminals 501, 502. In an embodiment, high-side switch circuits 505, 506 are implemented by FET-MOSFETs (JFETs) or bipolar transistors (BJTs). Furthermore, the high-side switch control terminal of high-side switch circuits 505, 506 is the gate terminal when implemented by JFETs, and is the base terminal when implemented by BJTs.

Lower-side switch circuit 507 is utilized to provide a path for the filter circuit 509 when high-side switch circuits 505, 506 are turned on. In an embodiment, lower-side switch circuit 507 is implemented by a diode, JFET, BJT or combination of aforementioned components. Lower-side switch circuit 507 comprises a first lower-side switch terminal electrically connected to high-side switch output terminal, and a second lower-side switch terminal electrically connected to reference power source terminal 508.

Buck converter 500 further comprises the filter circuit 509 to perform signal filtering in order to let the signal at the high-side switch output terminal approach a DC level; furthermore, in one embodiment the filter circuit 509 is implemented by a low pass filter. Filter circuit 509 further comprises a filter input terminal electrically connected to the high-side switch output terminal, and a filter output terminal electrically connected to power source output terminal 510.

More specifically, for the sake of conveniently illustrating the operation of the present invention, there are only two high-side switch circuits 505, 506 in the embodiment, and control signal sources 503, 504 are not the same control signal source. In other words, high-side switch circuits 505, 506 will not be turned on or turned off simultaneously. In other embodiments, however, the buck converter further comprises a third high-side switch circuit, and a third control signal source for controlling the operation of the third high-side switch circuit, where a control signal outputted from the third control signal source can be the same as one of the control signals outputted from control signal sources 503 and 504, or the control signal outputted from the third control signal source can be different from control signals generated from control signal sources 503 and 504. Therefore, if there are at least two high-side switch circuits implemented in the system of the present invention, then at least two control signal sources are needed; and regardless of the number of high-side switch circuits that are utilized in the design, there is no limitation to the total number of control signal sources.

Figure 5:
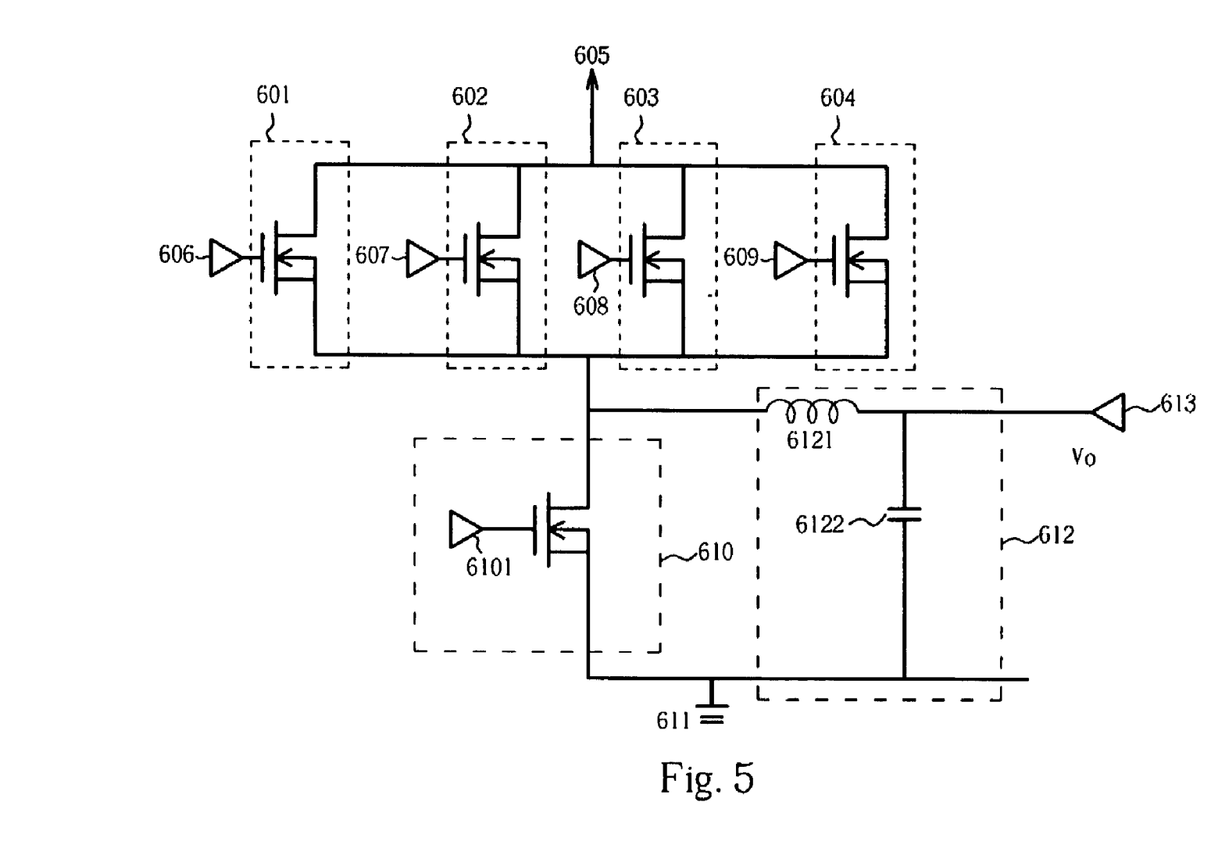
FIG. 5 illustrates a circuit diagram of an embodiment according to the present invention.

Referring to FIG. 5, FIG. 5 illustrates a circuit diagram of an embodiment according to the present invention. High-side switch circuits 601, 602, 603, 604 are implemented by N-type metal oxide semiconductor transistors (MOSFETs) in this embodiment, wherein high-side switch input terminals (i.e., drain terminals) are electrically connected to a power source input terminal 605, such as a 5V power supply; high-side switch control terminals (i.e., gate terminals) are electrically connected to control signal sources 606, 607, 608, 609, respectively. Lower-side switch circuit 610 is implemented by an N-type MOSFET in this embodiment, where the first lower-side switch terminal (i.e., a drain terminal) of lower-side switch circuit 610 is electrically connected to high-side switch output terminals (i.e., source terminals of high-side switch circuits), and the second lower-side switch terminal (i.e., a source terminal) is electrically connected to reference power source 611, such as a ground terminal. Lower-side circuit 610 further comprises a lower-side switch control signal source 6101 used to provide a lower-side switch control signal, wherein the lower switch control signal is utilized for controlling the on/off switching of lower-side switch circuit 610, such as to control lower-side switch circuit 610 to not switch on concurrently with high-side switch circuits 601, 602, 603, 604. The filter circuit 612 is an LC filter in this embodiment, where the first terminal of inductor 6121 (i.e., a filter input terminal) is electrically connected to high-side switch output terminals (i.e., source terminals of high-side switch circuits), and the second terminal (i.e., a filter output terminal) is electrically connected to power source output terminal 613. In addition, the second terminal of inductor 6121 (i.e., the filter output terminal) is further electrically connected to capacitor 6122 to form an inductor-capacitor filter. Please note that the drain and source terminal of MOSFET transistor are determined by the current flowing direction, therefore, the above-mentioned symbols in the circuit of the present invention are utilized for the purpose of illustrating the circuit architecture and are not meant to be construed as limitations.

Figure 6:
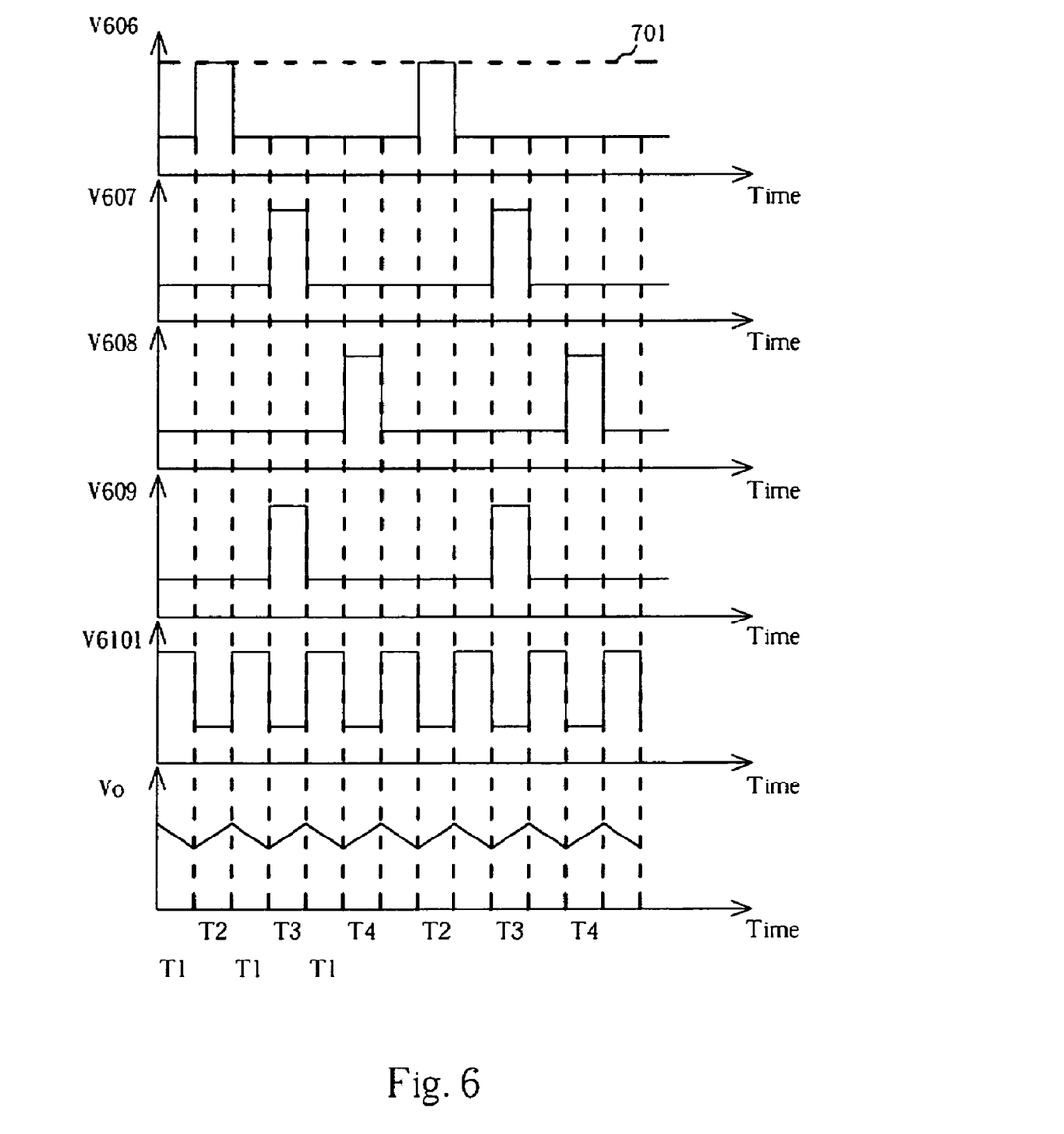
FIG. 6 illustrates a timing diagram of control signals generated from control signal sources, lower-side switch control signal generated from lower-side switch control signal source, and voltage at the power output terminal.

Please refer to FIG. 5 in conjunction with FIG. 6. FIG. 6 illustrates a timing diagram of control signals V606, V607, V608, V609 generated from control signal sources 606, 607, 608, 609, lower-side switch control signal V6101 generated from lower-side switch control signal source 6101, and voltage Vo at the power output terminal. Please note that high-side switch circuits 601, 602, 603, 604 and lower-side switch circuit 610 are implemented by N-type MOSFETs, therefore, when control signal is at a high voltage level (as shown in FIG. 6, line 701 represents a high voltage level), high-side switch circuits 601, 602, 603, 604, and lower-side switch circuit 610 are turned on. In order to describe the following operation more clearly, control signals V606, V607, V608, V609, and lower-side switch control signal V6101 are used to represent the on/off status of high-side switch circuits 601, 602, 603, 604, and lower-side switch circuit 610, respectively. For example, as shown in the timing diagram of control signal V606, high-side switch circuit 601 in time interval T2 is in a turned-on status; as shown in the timing diagram of control signal V607, high-side switch circuit 602 in time interval T3 is in a turned-on status; and the on/off status of the remaining high-side switch circuits can be easily determined.

Please note that high-side switch circuits 601, 602 are connected to different control signal sources 606, 607, respectively, and high-side switch circuits 601, 602 will not be turned on simultaneously. For instance, high-side switch circuits 601 is turned on in time interval T2 while high-side switch circuits 62 is turned on in time interval T3. More specifically, when the third high-side switch circuit 603 is implemented, one additional control signal source 608 should be provided, thereby making high-side switch circuit 603 turned on in time interval T4. Accordingly, when different control signal sources are added, high-side switch circuits can reduce the number of on/off switching operations, consequently, this also reduces unwanted heat and thereby prolongs the life of the high-side switch circuit. For example, the control signals V606, V607, V608 maintain the total number of on/off switching operations of high-side switch circuits 601, 602, 603 constant (i.e., the same), while high-side switch circuits 601, 602, 603 each have one third of total number of on/off switching operations. In other words, when the on/off switching frequency of high-side switch is 300 KHz, the on/off switching frequency for a prior art single high-side switch is 300 KHz; however, the on/off switching frequency for every high-side switch of the present invention becomes 100 KHz.

In another embodiment of the present invention, the control signal source 609 is identical to control signal source 607, and the high-side switch circuit 602 and the high-side switch circuit 604 are turned on simultaneously. Accordingly, the high-side switch circuit 602 and the high-side switch circuit 604 are capable of sharing the flowing electric current, thereby alleviating the power stress imposed thereon and prolonging the life thereof. More specifically, the present invention requires just two high-side switch circuits not be turned on concurrently, such as the high-side switch circuits 601, 602. However, any addition high-side switch circuits are not limited to being connected to the same control signal source for receiving control signals, such as signals V608, V609.

In the following, the lower-side switch control signal V6101 controls the lower-side switch circuit 610, where the lower-side switch circuit 610 is turned on in time interval T1. When the lower-side switch circuit 610 of this embodiment is turned on, the voltage Vo is gradually decreases; when lower-side switch circuit 610 of this embodiment is turned off, the voltage Vo is gradually increases.

Figure 7:
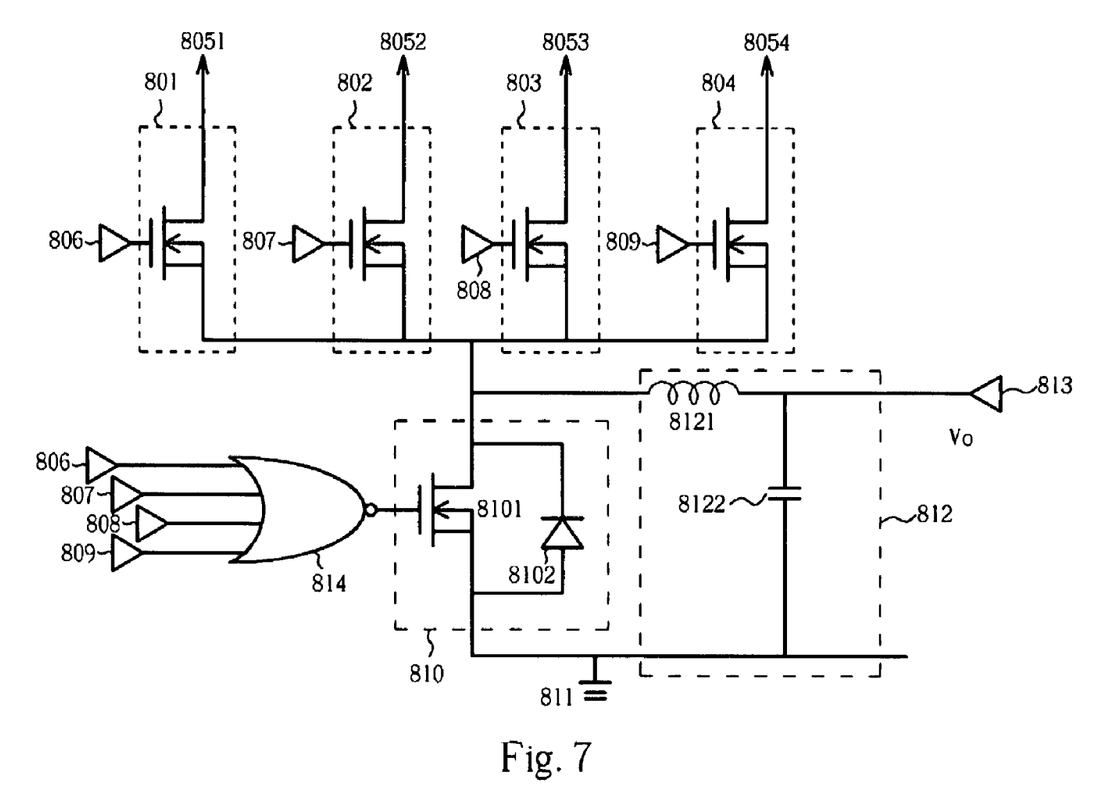
FIG. 7 illustrates a circuit diagram of another embodiment according to the present invention.

Referring to FIG. 7, FIG. 7 illustrates a circuit diagram of another embodiment according to the present invention. Being different from the circuit shown in FIG. 5, the circuit shown in FIG. 7 has high-side switch circuits 801, 802, 803, 804 electrically connected to different power source input terminals 8051, 8052, 8053, 8054, respectively, where power source input terminals 8051, 8052, 8053, 8054 can be different power sources. For example, power source input terminals 8051, 8052 represent 5V power sources, and power source input terminals 8053, 8054 represents 3V power sources. The output power is controlled by duty cycle D of control signal sources 806, 807, 808, 809. Another difference is that lower-side switch circuit 810 can be a combination of transistor and diode in this embodiment. For example, transistor 8101 is connected to diode 8102 in parallel, and control terminal of transistor 8101 is further electrically connected to a NOR gate 814, where NOR gate 814 receives signals generated from control signal sources 806, 807, 808, 809. Accordingly, the high-side switch circuits 801, 802, 803, 804 can have a reduced number of on/off switching operations and thus reduced heat generation thereby prolonging the life of the high-side switch circuits. Furthermore, by controlling the lower-side switch circuit 810 using the NOR gate 814, the voltage conversion is completed through the high-side switch circuits 801, 802, 803, 804, the lower-side switch circuit 810, and the filter circuit 812. Please note that there is no limitation for adding additional components between the high-side switch circuits 801, 802, 803, 804 and the lower-side switch circuit 810. For example, a diode device can be added there between. Similarly, there is no limitation for adding additional components to the individual high-side switch circuit 801, 802, 803, 804, nor is this a limitation for the lower-side switch circuit 810 and filter circuit 812.

Briefly summarized, the buck converter of the present invention utilizes at least two different control signal sources to control the on/off status of high-side switch. In this way, not only is the operating frequency of a single high-side switch circuit reduced, but also the switching loss of the high-side switch circuits is reduced to thereby prolong the life of the high-side switch circuits. As a result, using smaller filter capacitors is applicable, and therefore the area of the entire system can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A buck converter, comprising:
  a first high-side switch circuit, having a first high-side switch input terminal electrically connected to a first power input terminal, a first high-side switch control terminal electrically connected to a first control signal source, and a first high-side switch output terminal;
  a second high-side switch circuit, having a second high-side switch input terminal electrically connected to a second power input terminal, a second high-side switch control terminal electrically connected to a second control signal source, and a second high-side switch output terminal, the second high-side switch output terminal being electrically connected to the first high-side switch output terminal;
  a lower-side switch circuit, having a first lower-side switch terminal electrically connected to the first high-side switch output terminal and a second lower-side switch terminal electrically connected to a reference power terminal; and
  a filter circuit, having a filter input terminal electrically connected to the first high-side switch output terminal, and a filter output terminal electrically connected to a power output terminal;
  wherein the first control signal source and second control signal source make the first high-side switch circuit and the second high-side switch circuit not turned on at the same time, and the lower-side switch circuit further comprises:
  a third lower-side switch terminal; and
  a NOR gate, having a NOR gate output terminal and a plurality of NOR gate input terminals, wherein the NOR gate output terminal is electrically connected to the third lower-side switch terminal, and the plurality of NOR gate input terminals are electrically connected to the first and second control signal sources, respectively.

2. The buck converter of claim 1, wherein the first high-side switch circuit is implemented by a metal oxide semiconductor transistor or a bipolar transistor.

3. The buck converter of claim 1, wherein the second high-side switch circuit is implemented by a metal oxide semiconductor transistor or a bipolar transistor.

4. The buck converter of claim 1, wherein the first lower-side switch circuit is implemented by a metal oxide semiconductor transistor or a bipolar transistor.

5. The buck converter of claim 1, wherein the first lower-side switch circuit comprises a diode connected to a metal oxide semiconductor transistor in parallel.

6. The buck converter of claim 1, wherein the reference power terminal is a ground terminal.

7. The buck converter of claim 1, wherein the filter circuit is implemented by an inductor-capacitor filter.

8. The buck converter of claim 1, wherein the filter circuit is implemented by a resistor-capacitor filter.

9. The buck converter of claim 1, further comprising:
at least a third high-side switch circuit, having a third high-side switch input terminal, a third high-side switch output terminal, and a third high-side switch control terminal;
wherein the third high-side switch input terminal is electrically connected to a third power input terminal, the third high-side switch control terminal is electrically connected to a third control signal source, and the third high-side switch output terminal is electrically connected to the first high-side switch output terminal.

10. The buck converter of claim 9, wherein the third power input terminal is identical to the first power input terminal.

11. The buck converter of claim 9, wherein the third control signal source is identical to the first control signal source for making the first high-side switch circuit and the third high-side switch circuit turned on at the same time.

12. The buck converter of claim 9, wherein the third high-side switch circuit is implemented by a metal oxide semiconductor transistor or a bipolar transistor.

13. The buck converter of claim 9, wherein the lower-side switch circuit further comprises:
a third lower-side switch terminal; and
a NOR gate, having a NOR gate output terminal and a plurality of NOR gate input terminals, wherein the NOR gate output terminal is electrically connected to the third lower-side switch terminal, and the plurality of NOR gate input terminals are electrically connected to the first and second control signal sources, respectively.

14. The buck converter of claim 9, wherein the reference power terminal is a ground terminal.

15. The buck converter of claim 9, wherein the filter circuit is implemented by a resistor-capacitor filter.

16. A buck converter, comprising:
at least two high-side switch circuits each having a high-side switch input terminal, a high-side switch output terminal, and a high-side switch control terminal, wherein the high-side switch input terminal of each high-side switch circuit is electrically connected to a power input terminal, and high-side switch control terminals of the at least two high-side switch circuits are electrically connected to different control signal sources, respectively;
at least one lower-side switch circuit, having a first lower-side switch terminal and a second lower-side switch terminal, wherein the first lower-side switch terminal is electrically connected to the high-side switch output terminal, the second lower-side switch terminal is electrically connected to a reference power terminal; and
a filter circuit, having a filter input terminal and a filter output terminal, wherein the filter input terminal is electrically connected to the high-side switch output terminal, and the filter output terminal is electrically connected to a power output terminal;
wherein the lower-side switch circuit further comprises:
a third lower-side switch terminal; and
a NOR gate, having a NOR gate output terminal and a plurality of NOR gate input terminals, wherein the NOR gate output terminal is electrically connected to the third lower-side switch terminal, and the plurality of NOR gate input terminals are electrically connected to the first and second control signal sources, respectively.

17. A buck converter, comprising:
a first high-side switch circuit, having a first high-side switch input terminal electrically connected to a first power input terminal, a first high-side switch control terminal electrically connected to a first control signal source, and a first high-side switch output terminal;
a second high-side switch circuit, having a second high-side switch input terminal electrically connected to a second power input terminal, a second high-side switch control terminal electrically connected to a second control signal source, and a second high-side switch output terminal, the second high-side switch output terminal being electrically connected to the first high-side switch output terminal;
a lower-side switch circuit, having a first lower-side switch terminal electrically connected to the first high-side switch output terminal and a second lower-side switch terminal electrically connected to a reference power terminal; and
a filter circuit, having a filter input terminal electrically connected to the first high-side switch output terminal, and a filter output terminal electrically connected to a power output terminal;
at least a third high-side switch circuit, having a third high-side switch input terminal, a third high-side switch output terminal, and a third high-side switch control terminal;
wherein the first control signal source and second control signal source make the first high-side switch circuit and the second high-side switch circuit not turned on at the same time; the third high-side switch input terminal is electrically connected to a third power input terminal, the third high-side switch control terminal is electrically connected to a third control signal source, the third high-side switch output terminal is electrically connected to the first high-side switch output terminal, and the third power input terminal is identical to the first power input terminal.

18. A buck converter, comprising:
a first high-side switch circuit, having a first high-side switch input terminal electrically connected to a first power input terminal, a first high-side switch control terminal electrically connected to a first control signal source, and a first high-side switch output terminal;
a second high-side switch circuit, having a second high-side switch input terminal electrically connected to a second power input terminal, a second high-side switch control terminal electrically connected to a second control signal source, and a second high-side switch output terminal, the second high-side switch output terminal being electrically connected to the first high-side switch output terminal;
a lower-side switch circuit, having a first lower-side switch terminal electrically connected to the first high-side switch output terminal and a second lower-side switch terminal electrically connected to a reference power terminal; and
a filter circuit, having a filter input terminal electrically connected to the first high-side switch output terminal, and a filter output terminal electrically connected to a power output terminal;

at least a third high-side switch circuit, having a third high-side switch input terminal, a third high-side switch output terminal, and a third high-side switch control terminal;

wherein the first control signal source and second control signal source make the first high-side switch circuit and the second high-side switch circuit not turned on at the same time; the third high-side switch input terminal is electrically connected to a third power input terminal, the third high-side switch control terminal is electrically connected to a third control signal source, the third high-side switch output terminal is electrically connected to the first high-side switch output terminal, and the third control signal source is identical to the first control signal source for making the first high-side switch circuit and the third high-side switch circuit turned on at the same time.

* * * * *